Feb. 20, 1934.  H. CAMINEZ  1,948,479
OIL PRESSURE RELIEF VALVE
Filed Feb. 23, 1933

Inventor
Harold Caminez
By Blackmore, Spencer & Flint
Attorneys

Patented Feb. 20, 1934

1,948,479

UNITED STATES PATENT OFFICE 1,948,479

OIL PRESSURE RELIEF VALVE

Harold Caminez, Indianapolis, Ind., assignor to General Motors Corporation, Detroit, Mich., a corporation of Delaware Application February 23, 1933. Serial No. 657,933

1 Claim. (Cl. 184—6)

This invention relates to lubricating systems applied to internal combustion engines used on airplanes, automotive vehicles, etc.

In lubricating systems having an oil filter or lubricant purifier therein, it is sometimes desirable to have the oil from the filter piped directly to the bearing parts of the engine and to maintain a substantially constant pressure in the oil line from the filter to the bearings. It has been impractical to do this with prior constructions and it is one of the objects of the invention to disclose a combination which will purify or filter the oil and send it directly from the filtering medium to the bearing parts and maintain the filtered oil at a substantially uniform pressure.

The object of the invention is accomplished by providing the oil filter with a pipe which conducts the purified oil to the bearings and in providing a passage leading from the filter casing to the oil pan or reservoir, this passage being controlled by a spring pressed valve which is subject to the oil pressure in the purified oil line from the filter. When the pressure exceeds a predetermined amount the valve will be opened to cause unfiltered oil to be bypassed directly to the oil pan without passing through the filter. The valve will maintain a substantially constant pressure in the filtered oil line. The usual bypass is provided in the filter casing to cause unpurified oil to flow to the bearings in case the filter is unable to pass sufficient oil.

The invention is disclosed on the accompanying drawing in which.

Figures 1, 2:
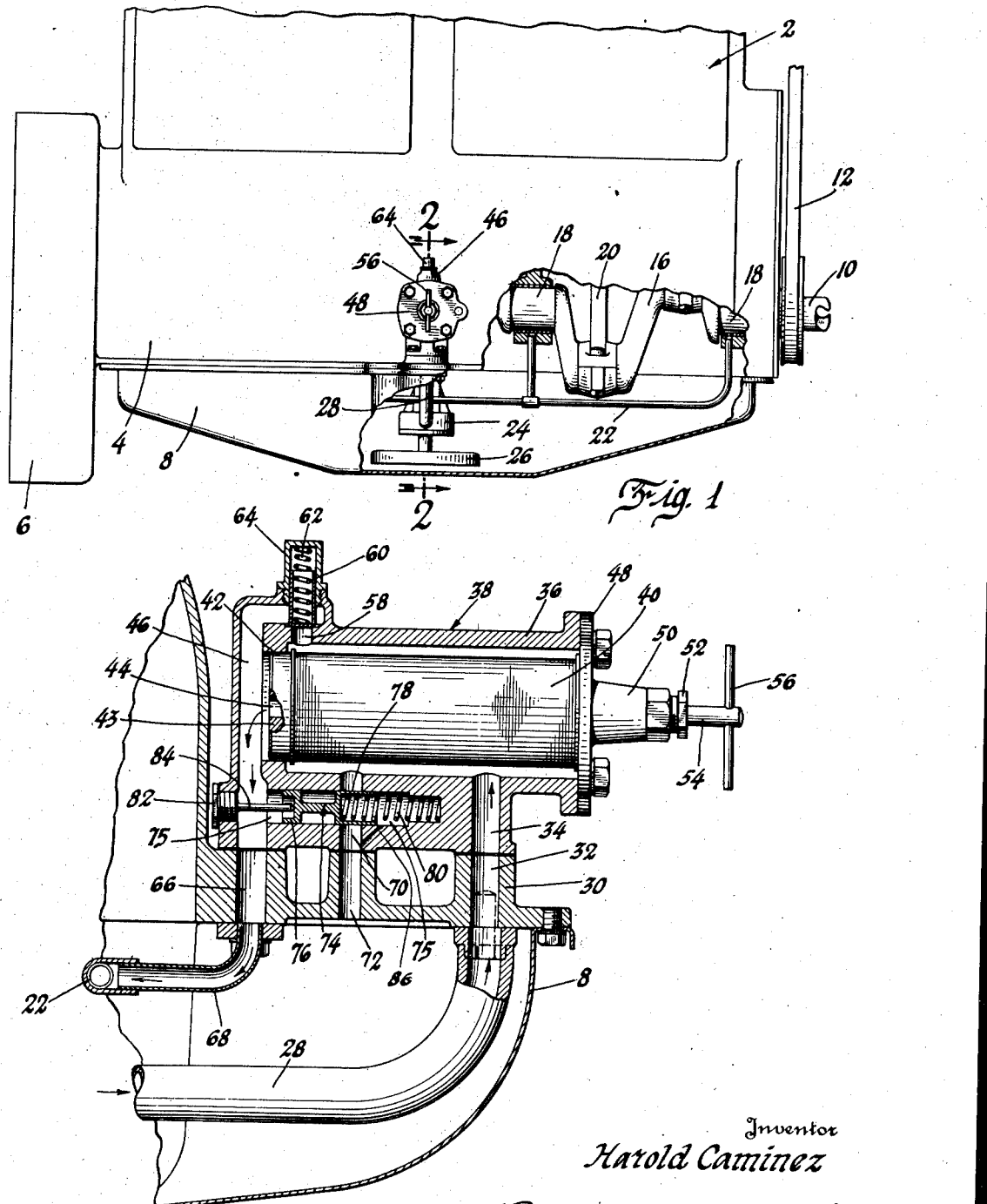
Figure 1 is a side view of an internal combustion engine with parts broken away and showing the invention applied.
Figure 2 is a section taken on the line 2—2 of Figure 1.

Referring to the drawing, the numeral 2 indicates an engine as a whole. The engine includes the engine block 4, clutch housing 6, oil pan or reservoir 8, crank shaft 10, fan belt 12, crank throws 16, bearings 18, connecting rods 20 leading to the usual pistons, oil manifold 22, and oil pump 24 having the usual screen 26. The parts so far described are conventional, and per se form no part of the invention.

From the oil pump 24 the contaminated oil in the oil pan or reservoir 8 is delivered to a pipe 28 secured to an integral extension or a separable bracket 30 extending away from the crank case. The bracket 30 has a lubricant passage 32 connecting with the lubricant passage 34 in the casing 36 of the oil filter or purifier indicated as a whole at 38. Inside the casing there is mounted the filtering element 40 which may be of any suitable type such as a series of spaced discs, a fine mesh fabric screen, or a cloth. The filtering element 40 extends the length of the casing 36 and closes the right hand end thereof as indicated at 42. The end of the filtering medium 40 is closed by the plate 43 having an opening 44 to allow the filtered oil to flow to the filtered oil passage 46. The right hand end of the casing 36 is closed by a cover plate 48 having a bearing 50 formed thereon closed by a packing held in liquid tight relation by packing nut 52 which forces the packing around the shank 54 of a cleaning element. At the end of the shank 54 there is a handle 56 and where a disc type of filter is used, the handle 56 is used to rotate the shank 54 and the discs comprising the filter to cause a series of scrapers mounted on the shaft 56 to scrape between the edges of the discs to remove collected impurities. Where a fine mesh wire fabric is used the shank 54 is used to reciprocate a piston to force the filtered oil through the fabric in a reverse direction to remove collected impurities. A sump and an outlet therefor (not shown) may be provided in the bottom of the casing 36.

The casing 36 is provided with a passage 58 controlled by a bypass valve 60 urged by a coil spring 62 to its closed position as shown in Figure 2. A suitable thimble 64 screw threaded into the extremity of the purified oil passage 46 holds the spring 62 and bypass valve 60 in position. When excessive pressure exists inside the casing 36 such as when the filtering element has collected a considerable amount of contaminated matter and will not allow the lubricant to pass therethrough, the pressure will unseat the bypass valve 60 to cause unpurified oil to flow through the opening 58 into the passage 46 and to the bearings so that the bearings will at all times be assured of an adequate supply of lubricant.

From the purified oil conduit 46 the oil passes through an oil passage 66 in the bracket 30 and into a pipe at 68 from where it is delivered to the manifold 22.

The casing 36 has another passage 70 which mates with a passage 72 in the bracket 30 which opens into the oil pan or reservoir 8. The passage 70 is controlled by a valve 74 operating in a bore or recess 75 formed in the casing 36 at right angles to the passage 70. The valve 74 comprises the piston head 76 and the gate portion 78 which controls the passage 70. The piston 76 and gate 78 are connected by a suitable neck so that both parts move in unison. The gate 78 is hollow and there is confined between the hollow portion and the end of the bore 76 a coil spring 80 which constantly urges the valve to the left when considering Figure 2. A plug 82 is adjustably threaded into an opening in the passage 46 and has a stem 84 thereon which strikes against the hollow portion of the piston 76 to limit the movement of the valve 74 to the left. A relief passage 86 connects the passage 70 and the bore 75.

The operation of the device is as follows: The pump 24 will draw contaminated lubricant from the oil pan 8 through the screen 26 and deliver the oil to the passage 28 to force it into the container 36. The pressure will force the oil through the filter 40, the contaminated matter being held on the exterior wall of the filter 40 while the filtered oil passes into the filter and through the opening 44 and flows to the bearings through the passages 46 and 66 and pipes 68 and manifold 22 to the bearings as indicated by the arrows. The spring 80 of the valve 74 is set at the definite pressure which it is desired to maintain in the filtered oil conduit 46. The spring 80 will hold the gate 78 seated as long as this pressure is not exceeded, but if for any reason, such as the passage of an excess amount of oil through the filter, the pressure in the filtered oil should exceed the tension of the spring 80, the pressure will act on the piston 76 to open the gate 78 to cause unfiltered oil to flow through the passage 70 and 72 to the crank case. The opening of this passage will prevent oil from passing through the filter and as the oil in the manifold 22 is used, the pressure will decrease and thereby allow the valve 74 to return to the position of Figure 2 to maintain the pressure constant.

The spring 62 of the bypass 60 is of sufficient strength so that under the usual operating conditions the normal supply of oil to the engine will go through the strainer. Since the oil pressure to the engine is controlled by spring 80 of the pressure control valve, the tension to which spring 60 is set will not affect the engine oil pressure. Should the filter be almost entirely plugged so that but little oil will flow through, the pressure in the casing will build up to a degree to cause the valve 60 to unseat to allow unfiltered oil to flow through the passage 46 and to the manifold 22. The purpose of this bypass is to assure adequate lubricant at all times to the bearings.

The main object of this invention is to have an oil control valve which will maintain constant oil pressure to the manifold 22 of the engine and which will permit the use of a fine mesh screen or cleaner which need be only of sufficient size to handle the oil to the engine and through which the oil normally bypassed will not flow.

In previous installations where a bypass is arranged at the entrance to the cleaner, the oil pressure to the engine is the difference of the pressure to which the bypass valve is set and the pressure drop through the strainer. With such prior arrangements it is necessary to have a rather weak spring on the bypass valve 60 in order that adequate oil pressure is always obtained on the engine. A large strainer must also be employed in order normally not to bypass the unfiltered oil. If the relief valve is arranged to regulate the oil pressure by bypassing the oil after it comes from the strainer, all of the oil pumped must flow through the strainer in which event a larger strainer is needed than is the case if only the oil going to the bearings is filtered.

I claim:

In combination with an engine having an oil receptacle and a force feed lubricating system, a lubricant purifier in said system, means to conduct the purified lubricant to the bearing parts of the engine, and a pressure relief valve operated by the pressure of the purified lubricant to maintain a substantially constant pressure in said first named means, said valve when open causing unpurified lubricant to flow to the receptacle.

HAROLD CAMINEZ.